(12) United States Patent
Tsuji (10) Patent No.: US 7,354,558 B2
(45) Date of Patent: Apr. 8, 2008

(54) EXHAUST GAS PURIFICATION SYSTEM (75) Inventor: Kimitoshi Tsuji, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 610 days.

(21) Appl. No.: 10/935,317

(22) Filed: Sep. 8, 2004

(65) Prior Publication Data
US 2005/0063879 A1    Mar. 24, 2005

(30) Foreign Application Priority Data
Sep. 24, 2003  (JP)  ............................. 2003-332540

(51) Int. Cl.
*B01D 50/00* (2006.01)
*F01N 3/00* (2006.01)
*F01N 3/02* (2006.01)

(52) U.S. Cl. .................... 422/177; 60/274; 60/275; 60/311

(58) Field of Classification Search ................ 422/177; 60/274, 275, 311
See application file for complete search history.

(56) References Cited

U.S. PATENT DOCUMENTS 5,263,317 A * 11/1993 Watanabe et al. ............. 60/275
5,557,923 A * 9/1996 Bolt et al. ..................... 60/274
5,950,424 A * 9/1999 Nojima ......................... 60/275

FOREIGN PATENT DOCUMENTS

| DE | 195 10 804 A1 | 9/1996 |
|---|---|---|
| JP | A-55-019935 | 2/1980 |
| JP | A-57-148017 | 9/1982 |
| JP | A-07-256142 | 10/1995 |
| JP | A 7-265652 | 10/1995 |
| JP | A 7-293223 | 11/1995 |
| JP | A-08-131840 | 5/1996 |
| WO | WO 97/40265 | 10/1997 |

\* cited by examiner

*Primary Examiner*—Walter D. Griffin
*Assistant Examiner*—Lessanework T Seifu
(74) *Attorney, Agent, or Firm*—Oliff & Berridge, PLC (57) ABSTRACT

An exhaust gas purification system includes a honeycomb structural member and a center electrode. The honeycomb structural member is disposed in an exhaust emission flow path from an engine. The center electrode extends along an axis of the honeycomb structural member from an upstream side thereof. A voltage of a polarity opposite from the polarity of the honeycomb structural member is applied to the center electrode. Sub-electrodes are further provided for controlling an electric field between the center electrode and the honeycomb structural member.

8 Claims, 6 Drawing Sheets

EXHAUST GAS PURIFICATION SYSTEM

This application claims priority from Japanese Patent Application No. 2003-332540 filed Sep. 24, 2003, which is hereby incorporated by reference herein.

BACKGROUND OF THE INVENTION

1. Field of the Invention

The present invention relates to an exhaust gas purification system used in an exhaust system of an internal combustion engine for purifying exhaust emissions.

2. Description of the Related Art

It has conventionally been proposed, as a technique for purifying exhaust emissions from an engine, to use an exhaust gas purification system that uses plasma generated by an ac voltage applied across electrodes (a plasma reactor) For example, a system disclosed in Japanese Patent Application Laid-open No. 7-293223(1995), is provided with a counter electrode disposed in an exhaust emission flow path from an engine and a discharge electrode disposed upstream of the counter electrode. Another system disclosed in Japanese Patent Application Laid-open No. 7-265652(1995) includes a honeycomb structural member used as a counter electrode disposed in an exhaust emission flow path from an engine and a discharge electrode disposed so as to run through a cell of the honeycomb structural member.

In these systems, when a high voltage is applied across the discharge electrode and the counter electrode, energy of plasma thereby generated sets HC, CO, NOx, and other substances contained in exhaust emissions in a free state (free radicals). These substances are then purified through chemical reactions with oxygen contained in the exhaust emissions.

In such systems, particulate matter, or PM, charged by the discharge electrode, is attracted by and adheres to the counter electrode of an opposite polarity. PM may densely adhere to some local areas of the counter electrode, while sparingly at other areas. If this happens, densely populated PM on a narrow area tends to become incompletely combustible. Then, residual ashes left unburned contribute to a reduced cross sectional area of the exhaust emissions flow path (an opening area). This results in an increase in pressure loss and a plugged up flow path, thus degrading purification performance of the system.

It is therefore an object of the present invention to provide means for suppressing uneven, or partly dense and partly sparing, adherence of PM on the counter electrode.

SUMMARY OF THE INVENTION

To achieve the foregoing object, the present invention provides an exhaust gas purification system, comprising: a honeycomb structural member disposed in an exhaust emission flow path from an engine; a center electrode extending along an axis of the honeycomb structural member from an upstream side thereof and being applied with a voltage of a polarity opposite from the polarity of the honeycomb structural member; and one or more sub-electrodes for controlling an electric field between the center electrode and the honeycomb structural member.

The sub-electrode is preferably disposed between the center electrode and the honeycomb structural member.

Any number of sub-electrodes may be provided. It is nonetheless preferable that a plurality of sub-electrodes be provided. It is even more preferable that two sub-electrodes be provided at 180° apart from each other, or four sub-electrodes be provided at 90° apart from each other.

If a plurality of sub-electrodes is used, it is preferable that a power circuit be further provided for applying an alternating current to a mutually opposing pair of sub-electrodes.

If the system is provided with the power circuit for applying the periodically varying current to the sub-electrodes, it is preferable that a frequency of the current output from the power circuit be varied according to operating condition of the engine. Even more preferably, the frequency is controlled to vary in such a manner that the higher a speed of the engine gets, the higher the frequency becomes.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
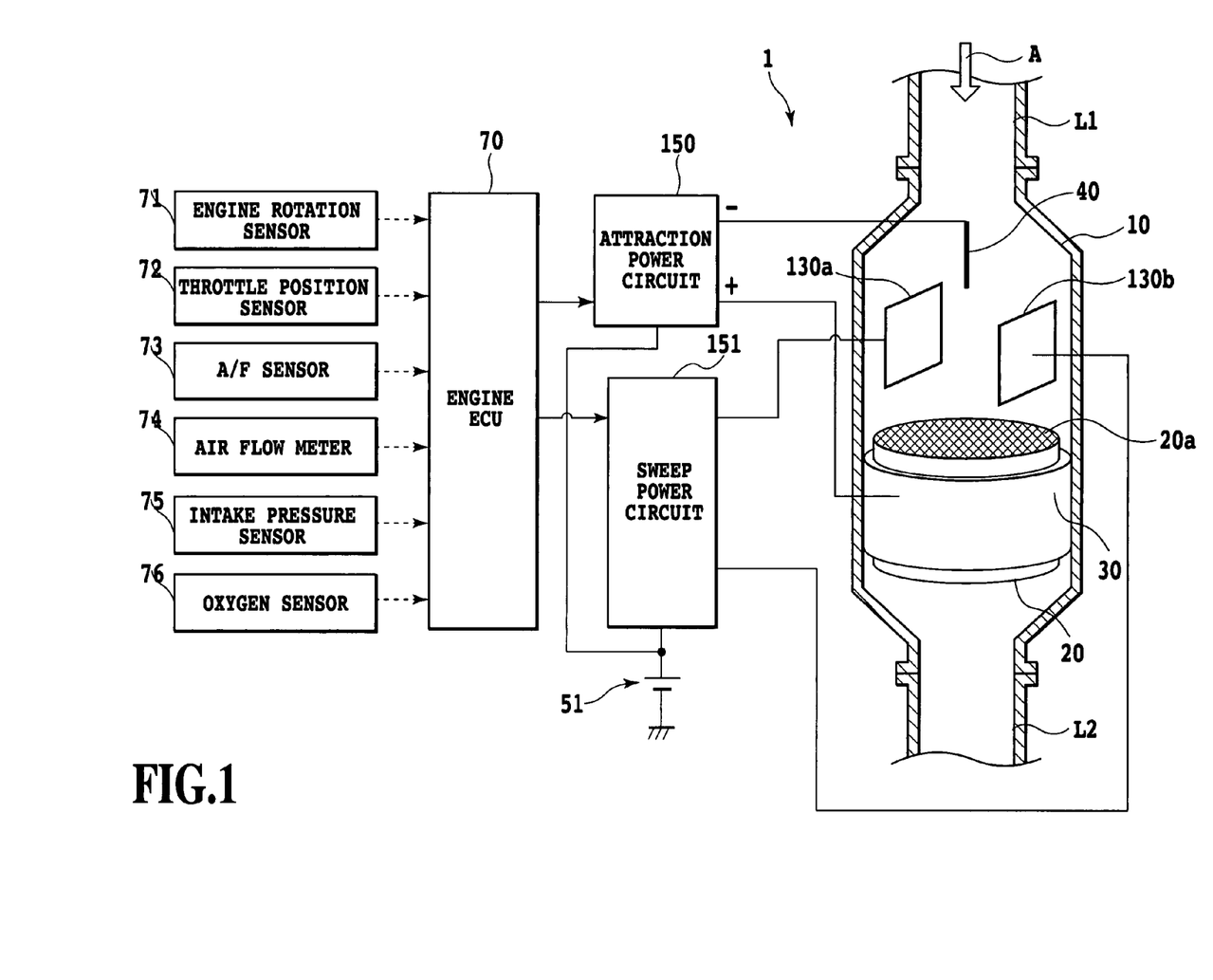
FIG. 1 is a block diagram schematically showing a first embodiment of an exhaust gas purification system of the present invention.

Preferred embodiments of the present invention will be described with reference to the accompanying drawings. FIG. 1 shows a first embodiment of an exhaust gas purification system of the present invention. An exhaust gas purification system 1 is built into an exhaust path of a not shown internal combustion engine for purifying exhaust emissions discharged from a combustion chamber of the engine.

As shown in FIG. 1, the exhaust gas purification system 1 includes a purification container 10 of metal formed into a substantially cylindrical shape. An upstream end of the purification container 10 is connected to a not shown exhaust manifold of the engine by way of an exhaust pipe L1. A downstream end of the purification container 10 is connected to a catalytic device and a not shown muffler by way of an exhaust pipe L2, and thus is in communication with the outside environment. The exhaust emissions discharged from the combustion chamber of the engine are introduced through the exhaust pipe L1 in the direction of an arrow A into the inside of the purification container 10. The exhaust emissions purified in the inside of the purification container 10 are to be discharged to the outside environment through the exhaust pipe L2.

A honeycomb structural member 20 of a substantially cylindrical shape is disposed inside the purification container 10. The honeycomb structural member 20 is a well-known honeycomb filter formed from a porous sintered body of silicon carbide. A number of cells 20a, each having a substantially square cross section, are formed uniformly along an axial direction of the honeycomb structural member 20. Each of the cells 20a is partitioned from each other by a thin cell wall. Each of the cells 20a is open at a front end portion and a rear end portion thereof to have an upstream side of the honeycomb structural member 20 communicated with a downstream side of the interior of the purification container 10. An oxidation catalyst is supported on surfaces of the cell walls. The oxidation catalyst is composed of platinum family elements (e.g. Pt or the like), metallic elements including vanadium, copper, manganese, and alumina, and metallic oxides and the like.

A cylindrically shaped outer electrode 30 is secured to an outer peripheral surface of the honeycomb structural member 20. A small-diameter, bar-shaped center electrode 40 is disposed on an upstream side of the honeycomb structural member 20 so as to be centrally located axially in a longitudinal direction of the honeycomb structural member 20. A number of needle-like protrusions (not shown) for enhancing electric discharge may be provided on an end portion on a downstream side of the center electrode 40.

Sub-electrodes 130a and 130b for electric field control are provided opposingly to, and in parallel with, each other on the downstream side of the center electrode 40 and the upstream side of the honeycomb structural member 20. The sub-electrodes 130a and 130b control the electric field formed between the center electrode 40 and the outer electrode 30, thereby controlling areas on which PM adheres on the honeycomb structural member 20.

An attraction power circuit 150 is connected to the center electrode 40 and the outer electrode 30. A sweep power circuit 151 is connected to the sub-electrodes 130a and 130b. Each of the power circuits 150 and 151 includes an inverter circuit, a transformer, rectifier diodes, a switching circuit, and the like. In addition, each of the power circuits 150 and 151 is connected to dc power source or vehicle battery 51, and an engine electronic control unit (hereinafter referred to as engine ECU) 70 for controlling the engine to which the exhaust gas purification system 1 is applied.

The engine ECU 70 includes, among others, a CPU, ROMs, RAMs, I/O ports and storage devices not shown. An engine rotation sensor 71, a throttle position sensor 72, and an A/F (air-fuel ratio) sensor 73 are connected to I/O ports of the engine ECU 70 as detecting devices. Detecting devices also connected to the I/O ports of the engine ECU 70 further includes an air flow meter 74 and an intake pressure sensor 75 provided on an intake side, and an oxygen sensor 76 provided on an exhaust side. Based on detection signals from these sensors, the engine ECU 70 calculates corresponding values to perform processing to be described later.

The engine ECU 70 follows the instructions given by predetermined control programs. In addition, the engine ECU 70 generates various types of signals based on those signals indicating engine operating conditions provided by the sensors 71 through 76 and the like. Specifically, the engine ECU 70 generates a drive pulse signal (gate signal) for driving inverter circuits of power circuits 150 and 151. The engine ECU 70 also generates a voltage indication signal for indicating the value of a voltage output from the power circuits 150 and 151. When a drive pulse signal and a voltage indication signal are provided by the engine ECU 70, the following operations are performed in power circuits 150 and 151. Specifically, a dc voltage from the dc power source 51 is converted to a corresponding ac voltage by the inverter circuit. The ac voltage is further stepped up by transformer and rectified, as necessary, by diodes. An output of a required voltage is thereby produced, as will be described later.

Operation of the exhaust gas purification system will be described in the following. When a user turns on an ignition switch to start the vehicle, the engine ECU 70 generates a drive pulse signal and a voltage indication signal according to the engine operating conditions, thereby operating the power circuits 150 and 151.

Figure 2:
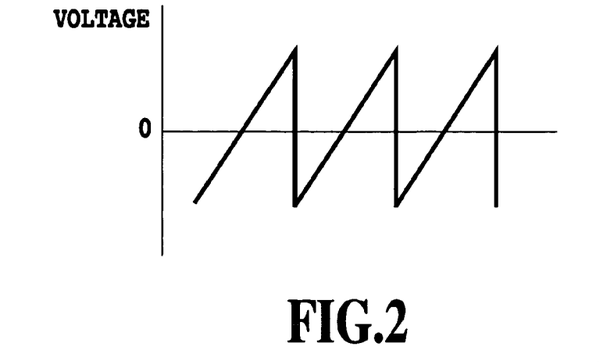
FIG. 2 is a graph showing an example of a sawtooth wave of a voltage output from a sweep power circuit to the sub-electrode.
Figure 3:
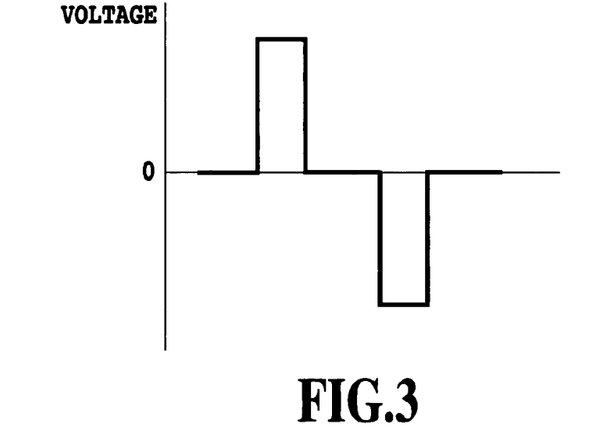
FIG. 3 is a graph showing an example of a pulse wave of the voltage output from the sweep power circuit to the sub-electrode.
Figure 4:
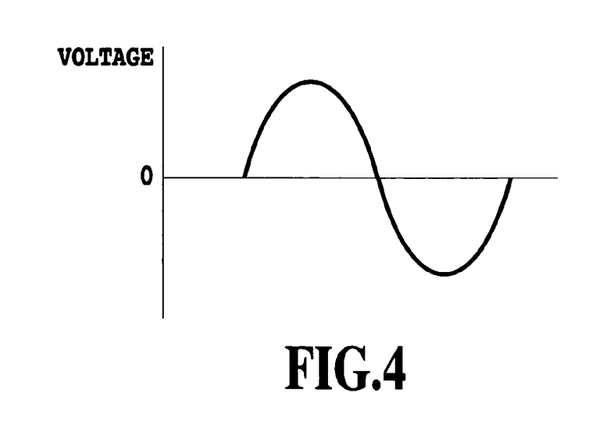
FIG. 4 is a graph showing an example of a sine wave of the voltage output from the sweep power circuit to the sub-electrode.

The attraction power circuit 150 produces output of a dc current of a predetermined value for the center electrode 40 and the honeycomb structural member 20. The sweep power circuit 151 produces output of a high voltage current of a positive and negative alternating, periodical waveform across sub-electrodes 130a and 130b. The voltage of output current produced from the power circuits 150 and 151 may have, for example, a sawtooth waveform as shown in FIG. 2, a pulse waveform as shown in FIG. 3, or a sine waveform as shown in FIG. 4.

In the exhaust gas purification system as configured in accordance with the first embodiment of the present invention, when a dc current of a predetermined voltage value is applied to the center electrode 40 and the outer electrode 30 from the attraction power circuit 150, PM contained in exhaust emissions is charged by electric discharge from the center electrode 40. The PM is then attracted onto the honeycomb structural member 20 having a polarity different from the polarity of the center electrode 40. On the other hand, when the sweep power circuit 151 applies a current that varies periodically in a positive direction and a negative direction around 0 V to the sub-electrodes 130a and 130b, the operation of the sub-electrodes 130a and 130b controls a traveling path of the PM. Specifically, the PM is then deflected alternately between the side of the sub-electrode 130a and the side of the sub-electrode 130b. In accordance with the first preferred embodiment of the present invention, therefore, PM can uniformly adhere and stick to a wider area of the honeycomb structural member 20, covering areas up to peripheral portions, without allowing the PM to adhere densely to an area near an axis of the honeycomb structural member 20. The first preferred embodiment of the present invention, as such, suppresses or compensates for uneven distribution, i.e. partly dense and partly sparing adherence of PM, thus scattering the PM thinly (less densely) over a wider area. Degradation of treating performance can therefore be suppressed by avoiding saturation of the amount of PM deposited at a specific localized area. For the same reasons, the cells 20a can be inhibited from being plugged up. This contributes to a prolonged sustenance of a good treatment performance.

HC, CO, NOx and other substances contained in exhaust emissions are made radical by plasma generated through discharge, being set into a state of easy reaction. The PM that has deposited on the honeycomb structural member 20 which is in a high temperature due to exposure to exhaust emissions is to be burned by heat generated during discharge between the center electrode 40 and the outer electrode 30. Otherwise, the PM may be made nontoxic through the action of the oxidation catalyst supported on the honeycomb structural member 20.

Figure 5:
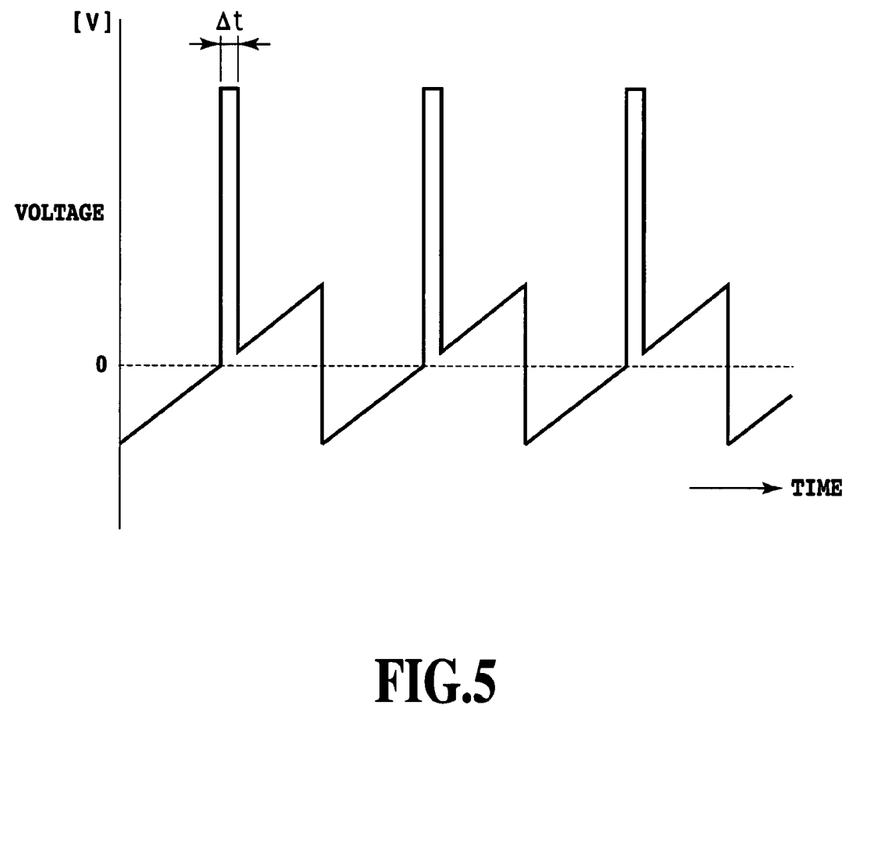
FIG. 5 is a graph showing an example of a sawtooth wave, on which a pulse wave is superposed, of the voltage output from the sweep power circuit to the sub-electrode.

A high-voltage pulse signal of a brief duration may be superposed on the alternating current applied to the sub-electrodes 130a and 130b by the sweep power circuit 151. Specifically, referring to FIG. 5, a high-voltage pulse of a brief duration Δt, so brief that the pulse does not substantially affect the traveling path of PM, may be superposed, as controlled by the engine ECU 70, on the voltage that varies periodically in the positive direction and the negative direction around 0 V. This even further promotes making applicable substances radical without involving a large energy consumption. Application timing of the high-voltage pulse may not necessarily be synchronized with the waveform cycle of the alternating current. Further, such a high-voltage pulse signal as this one maybe superposed on the dc current output from the attraction power circuit 150.

An exhaust gas purification system of a second preferred embodiment of the present invention will be described. The first preferred embodiment explained above uses one pair of sub-electrodes 130a and 130b. It is to be understood, however, that the number of sub-electrodes for electric field control of the present invention is not limited to one pair. Rather, only one or any desired number of the sub-electrodes may be provided. In the system of the second embodiment to be described in the following, two pairs of sub-electrodes are provided.

Figure 6:
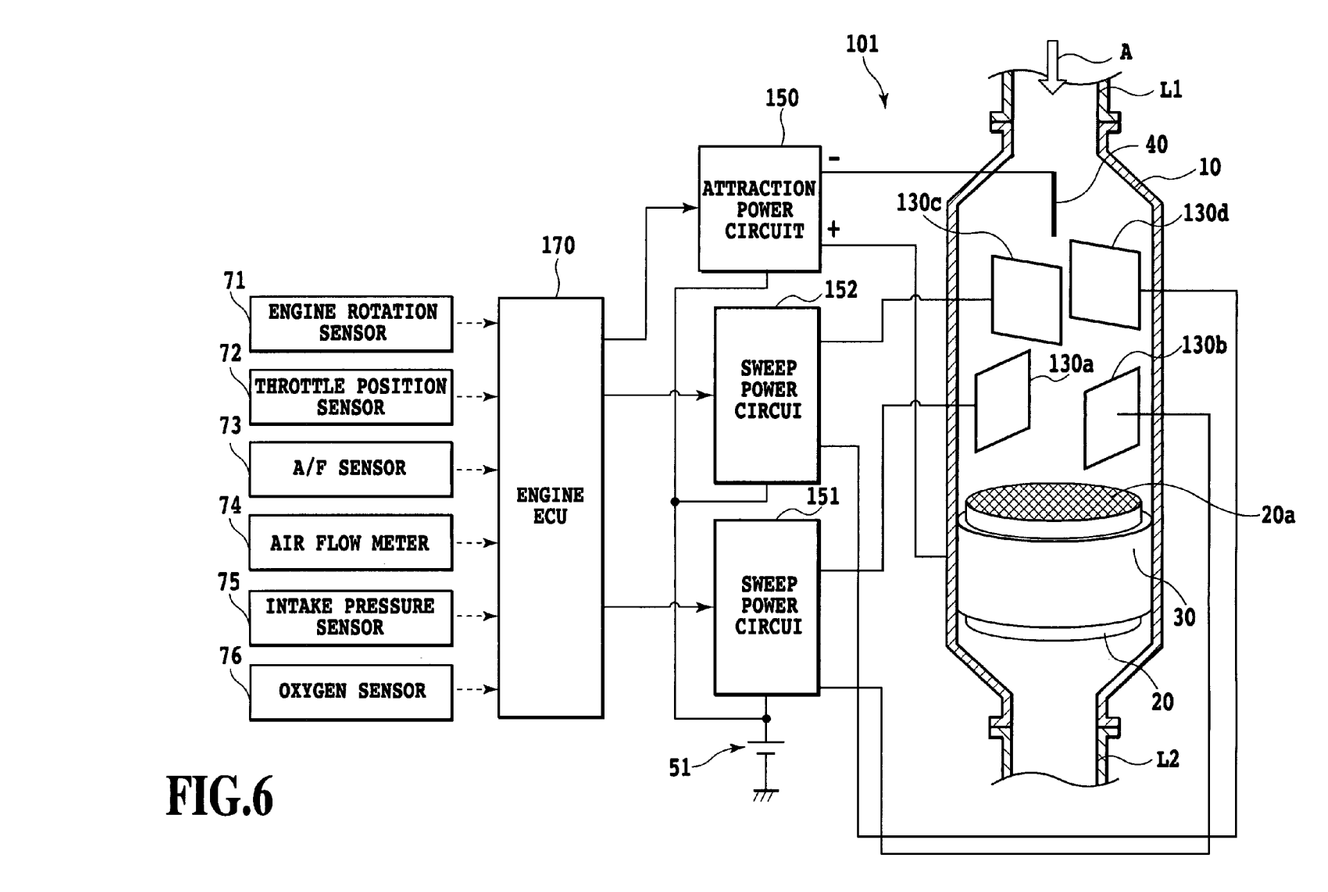
FIG. 6 is a block diagram schematically showing a second embodiment of an exhaust gas purification system of the present invention.

Referring to FIG. 6, an exhaust gas purification system 101 of the second preferred embodiment of the present invention is constructed as follows; in addition to the parts included in the system of the first embodiment, sub-electrodes 130c and 130d are provided. An axis connecting center points of the sub-electrodes 130c and 130d is made to run perpendicularly to an axis connecting center points of the sub-electrodes 130a and 130b as viewed from an axis of the honeycomb structural member 20. In addition, a sweep power circuit 152, having a structure similar to the sweep power circuit 151, is provided for controlling the sub-electrodes 130c and 130d.

In the second embodiment of the present invention, the traveling path of PM contained in the supplied exhaust emissions can be controlled in two orthogonal axial directions (X and Y directions) on a plane perpendicular to the central axis of the honeycomb structural member 20. The traveling path of PM can therefore be controlled even more minutely. Specifically, the sweep power circuits 151 and 152 are controlled in association with each other by an engine ECU 170. The point, at which PM is deposited on a front end surface of the honeycomb structural member 20, can thereby be arbitrarily set. In addition, the configuration of the second embodiment makes it possible to make a trajectory, through which PM deposit point is progressively moved, into any arbitrary shape, such as a circle and a spiral, as viewed from above the axis of the honeycomb structural member 20.

It may also be possible to estimate the amount of trapped PM by monitoring the amount of electric discharge or a discharge voltage value over the period of time beginning from the start of operation. The amount of trapped PM may even be estimated for each area of divisions given on the honeycomb structural member 20. Specifically, the entire area of the honeycomb structural member 20 may be divided, for example, into a section of each (or two or more) of the cells 20a. The estimate of the amount of trapped PM can be made, for example, based on the length of time or number of sets of time during which a point in the section is regarded as a PM deposit point (deposition target), together with conditions such as voltage value, temperature, and air-fuel ratio, all of which values could be stored in a predetermined memory area within the engine ECU 170.

Based on these values, the current cumulative amount of trapped PM can be estimated. The result of the estimation of the amount of trapped PM may be used, for example, for reducing a frequency of choosing a specific area after the amount of PM deposited on the area exceeds a predetermined value, or for increasing treatment capacity (e.g. applied voltage) for that specific area.

An exhaust gas purification system of a third preferred embodiment of the present invention will be described. In the system of the third embodiment, the frequency of the current applied to the sub-electrodes 130a and 130b is varied according to the engine operating conditions. The third embodiment has a hardware configuration the same as the system of the first embodiment. The control method for the system of the third embodiment is modified from the system of the first embodiment as detailed in the following. It should be understood that, while the system of the third embodiment has a hardware configuration the same as the system of the first embodiment, the control for varying the frequency of the current applied to the sub-electrodes according to the engine operating conditions may be applied to the hardware configuration the same as the system of the second embodiment.

Figure 7:
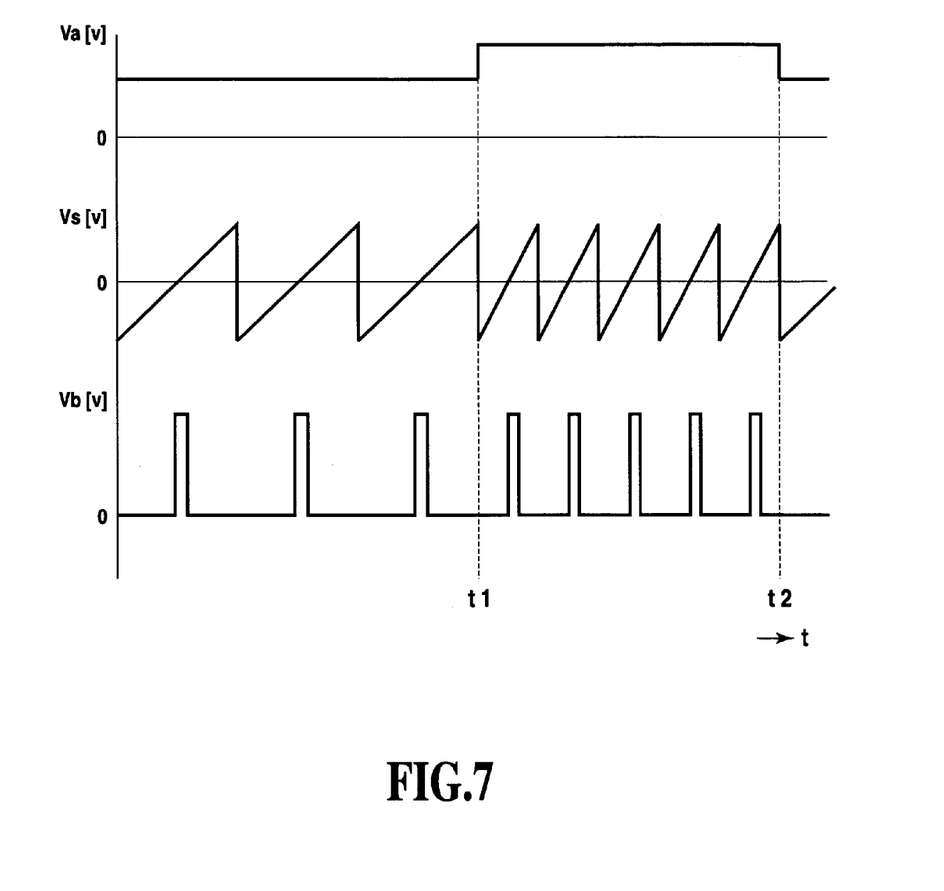
FIG. 7 is a graph showing waves of a voltage output from power circuits in a third embodiment of an exhaust gas purification system of the present invention.

In the third embodiment of the present invention, the frequency of the current applied to the sub-electrodes 130a and 130b, and the voltage value and the pulse count per unit time from the attraction power circuit 150, are varied according to the engine operating conditions. These controls are specifically provided as follows. When the engine speed detected by the engine rotation sensor 71 exceeds a predetermined threshold value (for the period of time from a time t1 to a time t2 shown in FIG. 7), the frequency of applied current Vs for the sub-electrodes 130a and 130b, voltage value Va supplied from the attraction power circuit 150, and the pulse count per unit time of a high voltage pulse Vb output from the sweep power circuit 151 are increased, respectively.

Figure 8:
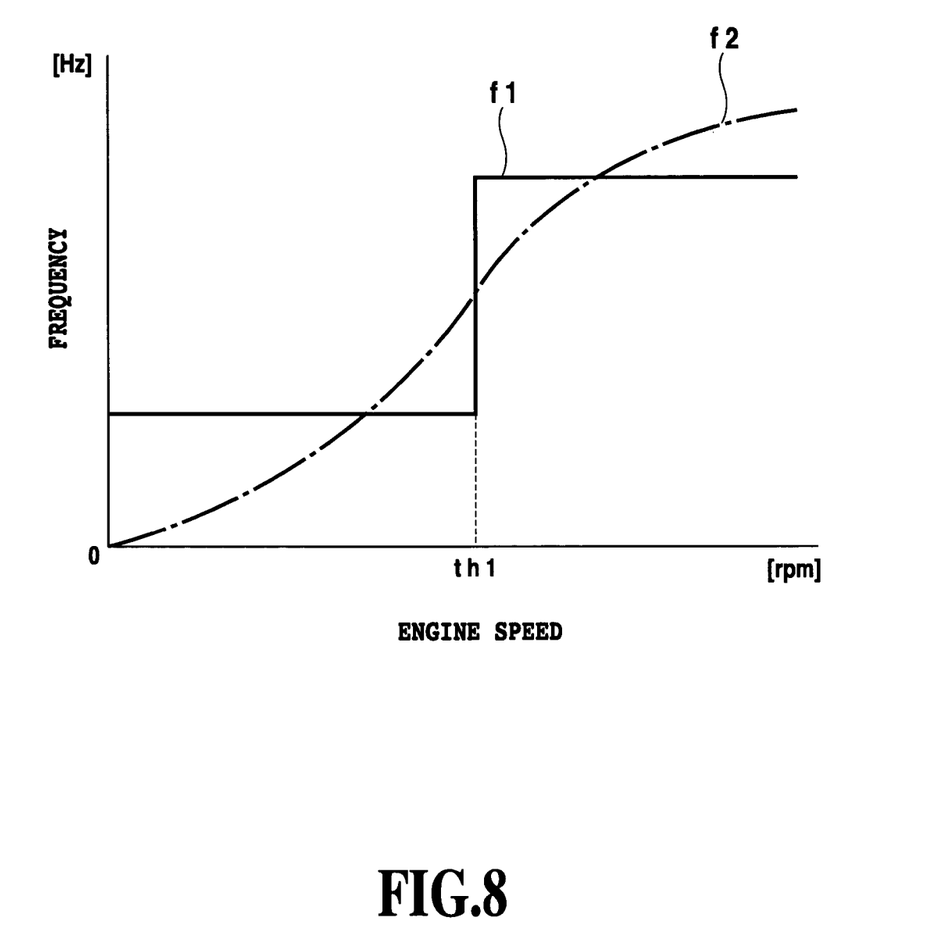
FIG. 8 is a graph showing typical frequency settings in the third embodiment of the exhaust gas purification system of the present invention.

FIG. 8 is a graph showing typical settings that represent a relationship between the engine speed and the frequency of the applied current for the sub-electrodes 130a and 130b. FIG. 8 shows that the lower the engine speed gets, the higher the frequency of the applied current becomes. The frequency of the applied current varied according to the engine speed is, however, set discretely as shown by a setting example f1 indicated by the solid line. Specifically, the frequency is set to take a relatively large value when a flow rate of exhaust emissions exceeds a predetermined threshold value th1, as compared with the time during which the flow rate remains lower than the threshold value th1. These settings are preferably stored in advance in a predetermined area of ROM within the engine ECU 70 in the form of a threshold value, a function, or data of a table format.

Generally speaking, the higher the engine speed gets, the greater the flow rate (volume per time) of exhaust emissions and the amount of toxic substances discharged become. For example, provided that a period of time, during which the engine temporarily runs at a high speed, is so brief that it is about half a period of time during which the current is applied to the sub-electrodes 130a and 130b. If the frequency of the applied current remains the same as that in an ordinary period, it is likely that PM will be deposited densely on some local areas in the honeycomb structural member 20. Therefore, if the frequency of the applied current for the sub-electrodes 130a and 130b is set to an increased level in such a case, uneven deposition of PM in a diametric direction could be prevented. In addition, it is preferable that the cycle of the current applied to the sub-electrodes 130a and 130b be set so as to be smaller than the period of time during which the engine speed becomes higher and temporarily exceeds a predetermined reference value (for example, 1 sec. at the shortest).

It is also preferable to increase the number of pulses applied across the sub-electrodes 130a and 130b per unit time if the engine speed is higher than a certain threshold and the amount of toxic substances contained in the exhaust emissions is large. This arrangement would suppress deposition of PM on the honeycomb structural member 20.

If the engine speed is high and the flow rate of the exhaust emissions is large, then the flow velocity of the exhaust emissions would be also high. If the voltage of the current applied by the attraction power circuit 150 remains the same as in the ordinary time in this condition, PM adhered on the cells 20a of the honeycomb structural member 20 could be peeled off by an increased fluid resistance, and could be flown downstream untreated. If, in such a case, the voltage of the current applied by the attraction power circuit 150 is increased as embodied according to the third embodiment, PM can be inhibited from being peeled off the honeycomb structural member 20.

In accordance with the third embodiment of the present invention, the relationship between the engine speed and the frequency of the applied current to the sub-electrodes 130a and 130b is set discretely as shown by the setting example f1 in FIG. 8. Instead of such a discrete setting, the frequency of the applied current may be set to progressively increase as the engine speed builds up, or substantially continuously, as shown by a setting example f2 shown by a chain line in FIG. 8.

In the exhaust gas purification system of the third embodiment, engine speed is used as a physical quantity representing the engine operating condition. However, other physical quantities may be used for detection of the engine operating condition according to the present invention. Such physical quantities include, for example: throttle position detected by the throttle position sensor 72; A/F ratio detected by the A/F sensor 73; amount of intake air detected by the air flow meter 74; operating position of a variable valve timing mechanism; fuel injection amount set by the engine ECU 70 in a course of a fuel injection control provided separately from this control; intake air pressure detected by an intake pressure sensor 75; oxygen concentration detected by an oxygen sensor 76; amount of accelerator pedal operation detected by an accelerator sensor not shown; exhaust gas temperature detected by an exhaust temperature sensor not shown; outside air temperature detected by an outside air temperature sensor not shown; and elapsed time after the engine has been started as detected by an ignition switch and a software timer not shown. It is possible to use current and target values of any kinds of physical quantities or parameters that are associated with, and usable for estimating, the exhaust emission flow rate or the amount of substances being treated per unit time.

It should be understood that those skilled in the art can make various changes and modifications to the invention. For example, while the sub-electrodes 130a, 130b, 130c and 130d are of parallel flat shape in each of the a fore mentioned preferred embodiments of the present invention, any other arbitrary shape may be used for the sub-electrodes. Further, while the powercircuits 150, 151 and 152 of several different types are individually provided in each of the aforementioned preferred embodiments of the present invention, other circuit configuration may be used; for example, some of these power circuits can be integrated together and a switching circuit is provided for selecting the appropriate destination for power supply as necessary.

In the preferred embodiments of the present invention described in the foregoing, the engine ECU 70 and 170 for controlling the engine is used also for providing controls relating to the present invention. However, a different approach may be possible, in which a processing system independent from the engine ECU can be used for providing controls relating to the present invention and some or all of the control parameters may be acquired as information from the outside such as the engine ECU.

Each of the aforementioned preferred embodiments of the present invention uses a plasma reactor that includes the cylindrical outer electrode 30 secured to the outer peripheral surface of the honeycomb structural member 20, to which power is supplied from the attraction power circuit 150. However, an exhaust gas purification system of a different structure may be arbitrarily applicable to the present invention. For example, the attraction power circuit 150 may be directly connected to the honeycomb structural member 20.

In each of the aforementioned preferred embodiments of the present invention, each of the cells 20a of the honeycomb structural member 20 provides communication between the upstream side and the downstream side of the honeycomb structural member 20. In place of this configuration, the honeycomb structural member may take a different structure; for example, end portions on the upstream side of some of these cells are plugged up and end portions on the downstream side of other cells adjoining thereto are plugged up. In this configuration, exhaust emissions that flow in byway of the cells with open upstream ends are filtered through the porous walls, and the resultant filtered exhaust emissions are discharged from the cells with open downstream ends. During this time, PM contained in the exhaust emissions is trapped by the walls. In addition, the present invention is applicable to systems of various types that can reform exhaust emissions by using action of electric power, regardless of whether the plasma is used or not.

The present invention has been described in detail with respect to preferred embodiments, and it will now be apparent from the foregoing to those skilled in the art that changes and modifications maybe made without departing from the invention in its broader aspect, and it is the intention, therefore, in the apparent claims to cover all such changes and modifications as fall within the true spirit of the invention.

What is claimed is:

1. An exhaust gas purification system, comprising:
    a honeycomb structural member disposed in an exhaust emission flow path from an engine;
    a center electrode extending along an axis of the honeycomb structural member from an upstream side thereof and being applied with a voltage of a polarity opposite from the polarity of the honeycomb structural member; and
    one or more sub-electrodes for controlling an electric field between the center electrode and the honeycomb structural member.

2. The exhaust gas purification system according to claim 1, wherein the sub-electrode is disposed between the center electrode and the honeycomb structural member.

3. The exhaust gas purification system according to claim 1, wherein said one or more sub-electrodes are a plurality of sub-electrodes.

4. The exhaust gas purification system according to claim 3, wherein said plurality of sub-electrodes is two sub-electrodes spaced at 180° apart from each other.

5. The exhaust gas purification system according to claim 3, wherein said plurality of sub-electrodes is four sub-electrodes spaced at 90° apart from each other.

6. The exhaust gas purification system according to claim 3, wherein a power circuit is further provided for applying an alternating current to a mutually opposing pair of the plurality of sub-electrodes.

7. The exhaust gas purification system according to claim 1, further comprising:
   a power circuit for applying a periodically varying current to said one or more sub-electrodes; and
   control means for varying a frequency of the current output from the power circuit according to operating condition of the said engine.

8. The exhaust gas purification system according to claim 7, wherein the control means controls the frequency in such a manner that the higher a speed of the engine gets, the higher the frequency becomes.

* * * * *